(12) United States Patent
Rodeheffer et al.

(10) Patent No.: US 7,689,780 B2
(45) Date of Patent: Mar. 30, 2010

(54) ADAPTIVE GRANULARITY REFINEMENT IN DETECTING POTENTIAL DATA RACES

(75) Inventors: Thomas L. Rodeheffer, Mountain View, CA (US); Yuan Yu, Cupertino, CA (US)

(73) Assignee: Microsoft Corporation, Redmond, WA (US)

( * ) Notice: Subject to any disclaimer, the term of this patent is extended or adjusted under 35 U.S.C. 154(b) by 385 days.

(21) Appl. No.: 11/696,809

(22) Filed: Apr. 5, 2007

(65) Prior Publication Data

US 2007/0192550 A1 Aug. 16, 2007

Related U.S. Application Data

(63) Continuation of application No. 11/070,766, filed on Mar. 2, 2005, now Pat. No. 7,231,498.

(51) Int. Cl.
*G06F 13/00* (2006.01)
(52) U.S. Cl. ...................... 711/150; 711/154
(58) Field of Classification Search ................. 711/150, 711/154
See application file for complete search history.

(56) References Cited

U.S. PATENT DOCUMENTS

2002/0120428 A1 8/2002 Christiaens ................. 702/186
2005/0283781 A1 12/2005 Karp et al. .................. 718/100

OTHER PUBLICATIONS

Mellor-Crummey, J., "On-the-Fly Detection of Data Races for Programs with Nested Fork-Join Parallelism", *Supercomputing*, 1991, 24-33.
Savage, S. et al., "Eraser: A Dynamic Data Race Detector for Multithreaded Programs", *ACM Transactions on Computer Systems*, Nov. 1997, 15(4), 391-411.
von Praun, C. et al., "Object Race Detection", *OOPSLA*, 2001, 70-82.
Yu, Y. et al., "RaceTrack: Race Detection for Managed Code", *Presentation at Microsoft TechFest*, Mar. 3-4, 2004, 39 pages.
Nishiyama, H., "Detecting Data Races using Dynamic Escape Analysis based on Read Barrier", *Proceedings of the Third Virtual Machine Research and Technology Symposium*, May 6-7, 2004, 13 pages.

*Primary Examiner*—Pierre-Michel Bataille
*Assistant Examiner*—John P Fishburn
(74) *Attorney, Agent, or Firm*—Woodcock Washburn LLP

(57) ABSTRACT

A method and apparatus are provided for detecting data races that overcome the limitations of the prior art. In some embodiments, this is accomplished by detecting a first access to an object, determining whether the first access is associated with a suspicious pattern, automatically refining a pattern detection granularity from the object to a memory location within the object if a determination is made that the first access is associated with the suspicious pattern, and reporting the data race if a second access associated with the suspicious pattern occurs at the memory location after the pattern detection granularity is refined.

4 Claims, 9 Drawing Sheets

Prior Art  FIG 2

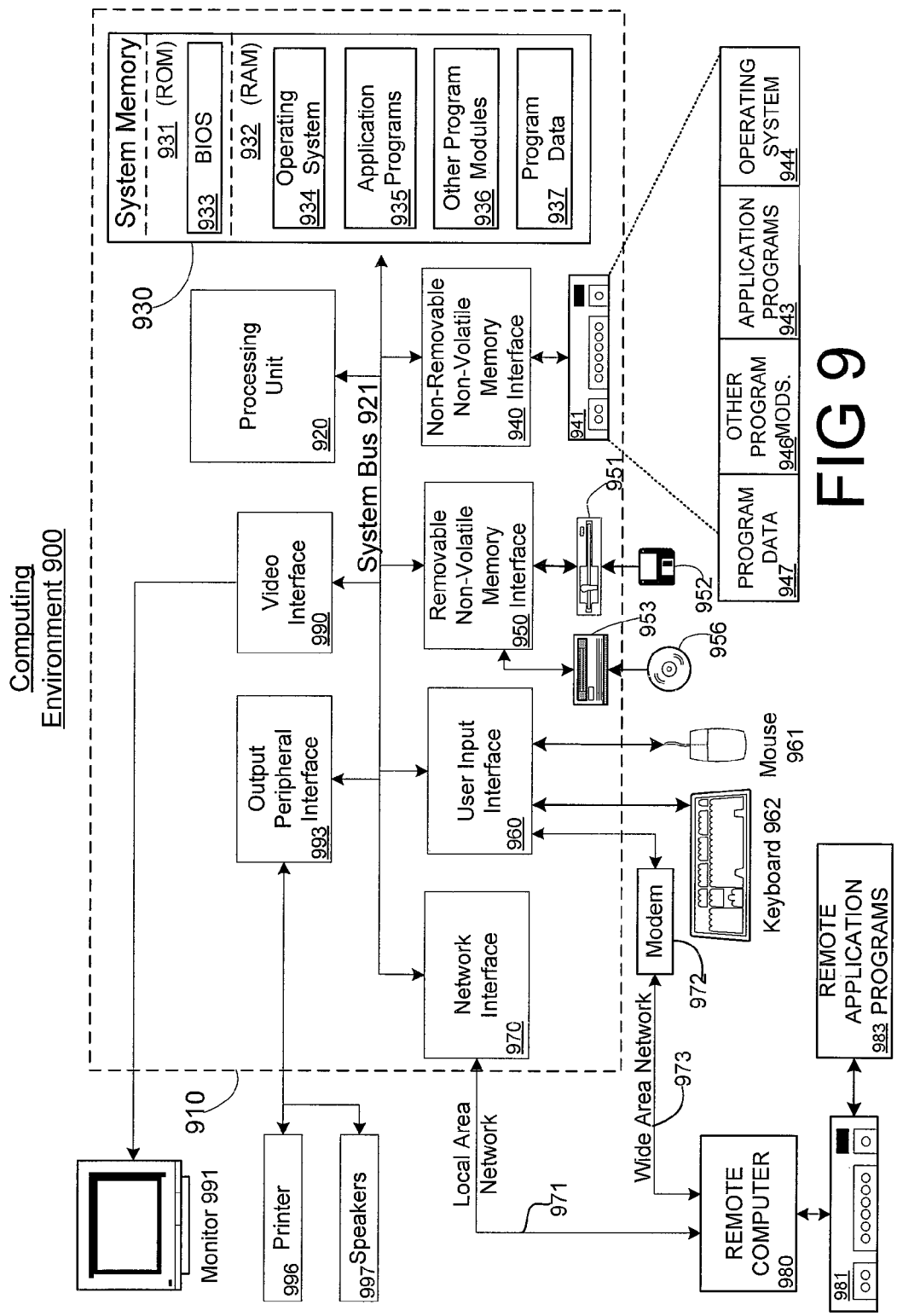

ADAPTIVE GRANULARITY REFINEMENT IN DETECTING POTENTIAL DATA RACES

REFERENCE TO RELATED APPLICATIONS

This is a continuation of Application No. 11/070,766, filed Mar. 2, 2005.

FIELD OF THE INVENTION

The present invention relates generally to software. More specifically, adaptive granularity refinement in detecting potential data races is described.

BACKGROUND OF THE INVENTION

A data race is a type of problem that may occur in multi-threaded programs or multiple programs accessing the same data which may lead to anomalous behavior of the program (s). Data races may occur where a shared variable can be accessed by various threads/programs simultaneously. Threads/programs "race" to access a shared variable and, depending upon which access occurs first, program results may vary unpredictably. Conventional solutions to this problem attempt to detect data races before they occur. This is partially due to the fact that data races are unpredictable and thus extremely difficult to reproduce during the debugging process. Indeed, any anomalous behavior caused by a data race is dependent on the precise timing of separate threads/programs accessing the same memory location and may thus disappear if that timing is altered during the debugging process.

Conventional solutions for data race detection monitor lock acquisition and memory accesses, computing an access pattern for each memory location and memory access. These solutions then evaluate the access pattern to memory locations to detect suspicious access patterns that may indicate a potential data race. An access pattern is "suspicious" if a memory location is shared among multiple threads without a common lock that may be used by individual threads/programs to govern access to the memory locations. Locks may be used to prevent data races from occurring where suspicious activity is detected.

A lock is a software construct that enables at most one thread/program to access a shared variable at a certain point in time. A locking discipline (i.e., a way of using of a lock) may require that a lock for a shared variable must be acquired before accessing the shared variable. Once a thread/program has completed its access to the shared variable, the lock is released. Locks are "acquired and released," enabling only one thread to access a particular shared variable at any given time. Locks and locking disciplines typically follow an access pattern.

FIG. 1 illustrates a conventional access pattern state diagram. Here, a series of states 102-112 and "superstates" 114-116 are described to illustrate conventional techniques for detecting potential data races. "Exclusive" describes those states where only one thread/program may access a variable at any given time. "Shared" refers to variables that may be accessed simultaneously by multiple threads/programs, unless one of the threads/programs is performing a write operation, which indicates a suspicious pattern (i.e., a potential data race). States 102-112 represent a particular state of an item during an access. Each item is initially in a "virgin" state 102, then moves to an exclusive first state 104 when a thread in a multi-threaded program (or a program) first accesses the item. When a second thread/program accesses the item (previously accessed by the first thread/program), the item moves to an exclusive second state 106. The separation of exclusive superstate 114 into an exclusive first state 104 and an exclusive second state 106 prevents generation of a false alarm. If a program is designed to allow a first thread/program to initialize an object, handing it over to a second thread/program without ever performing any simultaneous shared access, a false alarm indicating a potential data race may be generated.

When a different thread accesses an item in exclusive second state 106, the item moves to shared superstate 116. If the access is a read operation ("read"), then the item enters shared read state 108. In the event that the access is a write operation ("write"), the item enters shared modify state 110. This is an example of a "first shared" access. Subsequent accesses are also referred to as "shared" accesses. Also, if the shared access is a write and the item is in shared read state 108, the item moves to shared modify state 110. Entering a shared state (e.g., shared read state 108 or shared modify state 110) also initiates computation of a set of locks ("lockset") that are common to shared accesses to an item. The first lockset is set to the set of locks held by the accessing thread when the first shared access occurs. On every subsequent shared access, the item's lockset is reduced to the intersection of its lockset and the set of locks held by the accessing thread.

An access pattern's lockset can only decrease over time, as subsequent accesses occur. However, a shared modify access pattern with an empty lockset indicates a suspicious pattern. When a suspicious access pattern is first detected, conventional implementations generate a warning (e.g., warning state 112) of a potential data race. Typically, when a warning of a potential data race is generated, the stack of the thread associated with the suspicious pattern is dumped, enabling a user to diagnose a copy of the thread whether a potential data race exists while still permitting the program to run. A "warning" state 112 is entered if suspicious patterns are detected.

FIG. 2 illustrates conventional encoding of access patterns. As an example, conventional techniques encode information relevant to access patterns using 32-bit words that include state information. In each state, except virgin state 102, information in addition to the state name must be stored. In an exclusive state (e.g., exclusive states 104-106), an identifier for a thread exercising exclusive access is stored. In a shared state (e.g., shared states 108-110) a set of common locks is stored. In order to store an access pattern in one word, typically a few bits (e.g., bits 202-210) are used to encode the state name. Fields 212-220 are used to store remaining bits for a thread identifier or an index in a table of locksets.

One problem with conventional solutions is that a program's memory requirements are significantly increased. For each memory location used by a program to store data, another memory location is required to store an access pattern. Other conventional solutions for locking discipline combine the accesses to all memory locations in an object and require only one additional memory location to store the access pattern for an entire object. However, these solutions work only if every memory location (e.g., all elements in an array) follows the same locking discipline, which is often not the case. Another problem with conventional locking disciplines is that even if an object access pattern is stored, applying it to individual memory locations is a time consuming and labor intensive process and is typically applied only during the debugging process.

Thus, what are needed are systems and methods for refining the detection of potential data races without the limitations of conventional techniques.

SUMMARY OF THE INVENTION

Systems and methods are provided for detecting data races that overcome the limitations of the prior art. In some embodiments, this is accomplished by detecting a first access to an object, determining whether the first access is associated with a suspicious pattern, automatically refining a pattern detection granularity from the object to a memory location within the object if a determination is made that the first access is associated with the suspicious pattern, and reporting the data race if a second access associated with the suspicious pattern occurs at the memory location after the pattern detection granularity is refined as described.

In some embodiments, this is accomplished by detecting an access to an object, determining whether the access follows a suspicious pattern, adapting a granularity of detection from the object to a memory location within the object if the access follows the suspicious pattern, and generating a warning if another access following the suspicious pattern occurs after adapting the granularity of detection from the object to a memory location within the object.

In some embodiments, a memory is configured to store an object and a memory location within the object, and logic is configured to detect a first access to the object, determine whether the first access is associated with a suspicious pattern, automatically refine a pattern detection granularity from the object to a memory location within the object if a determination is made that the first access is associated with the suspicious pattern, and report the data race if a second access associated with the suspicious pattern occurs at the memory location after the pattern detection granularity is refined.

The above examples are illustrative of some techniques that may be used and additional examples are set forth in the following description, are obvious from the description, or may be learned by the practicing the described techniques. These examples may be realized and obtained by means of the implementations and combinations particularly pointed out in the appended claims.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 9 is a is a block diagram showing an exemplary computing environment in which aspects of the invention may be implemented.

DETAILED DESCRIPTION OF THE PREFERRED EMBODIMENTS

The invention can be implemented in numerous ways, including as a process, an apparatus, a system, a computer-readable medium such as a computer-readable storage medium or a computer network wherein program instructions are sent over optical or electronic communication links. In general, the steps of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications and equivalents are encompassed. Numerous specific details are set forth in the following description in order to provide a thorough understanding. These details are provided for the purpose of example and the described techniques may be practiced according to the claims without some or all of these specific details. For the purpose of clarity, technical material that is known in the technical fields related to the examples has not been described in detail to avoid unnecessarily obscuring the description.

Refinement of access pattern detection granularity from a whole-object ("object") to an individual memory location may be performed by determining whether an access pattern that qualifies as a suspicious access pattern ("suspicious pattern") has occurred on an object. If an access to an object is determined to have a suspicious pattern, then access pattern detection is granularly refined to individual memory locations within the object. Subsequently, the need for an extra storage space for each memory location is eliminated until an object access having a suspicious pattern is detected. By adaptively refining the granularity of access pattern detection, a single access pattern may be stored for objects that are not shared by individual threads of a multi-threaded program or multiple program or whose locking discipline is uniform for memory locations or fields within the object.

Figure 1:
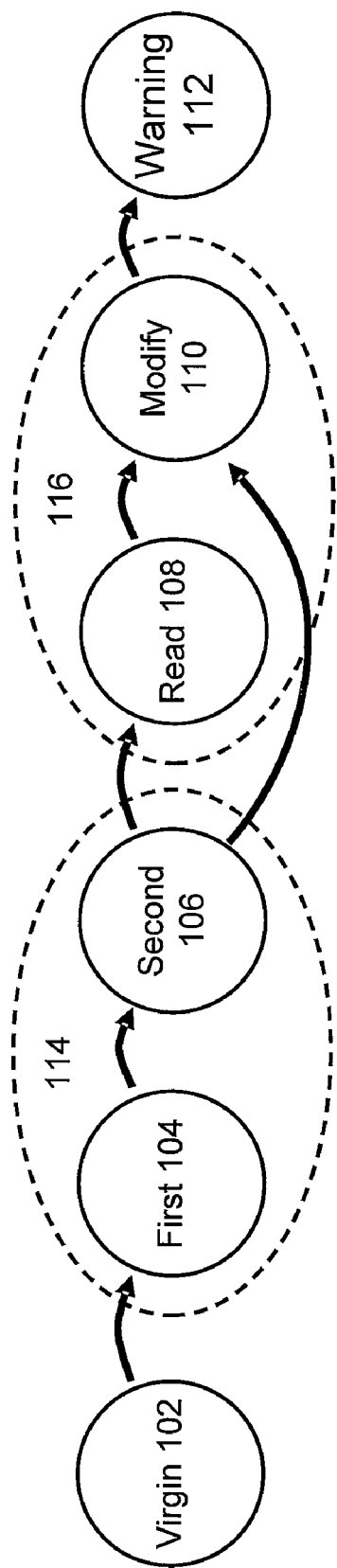
FIG. 1 is an illustration of a conventional access pattern state diagram.
Figure 2:
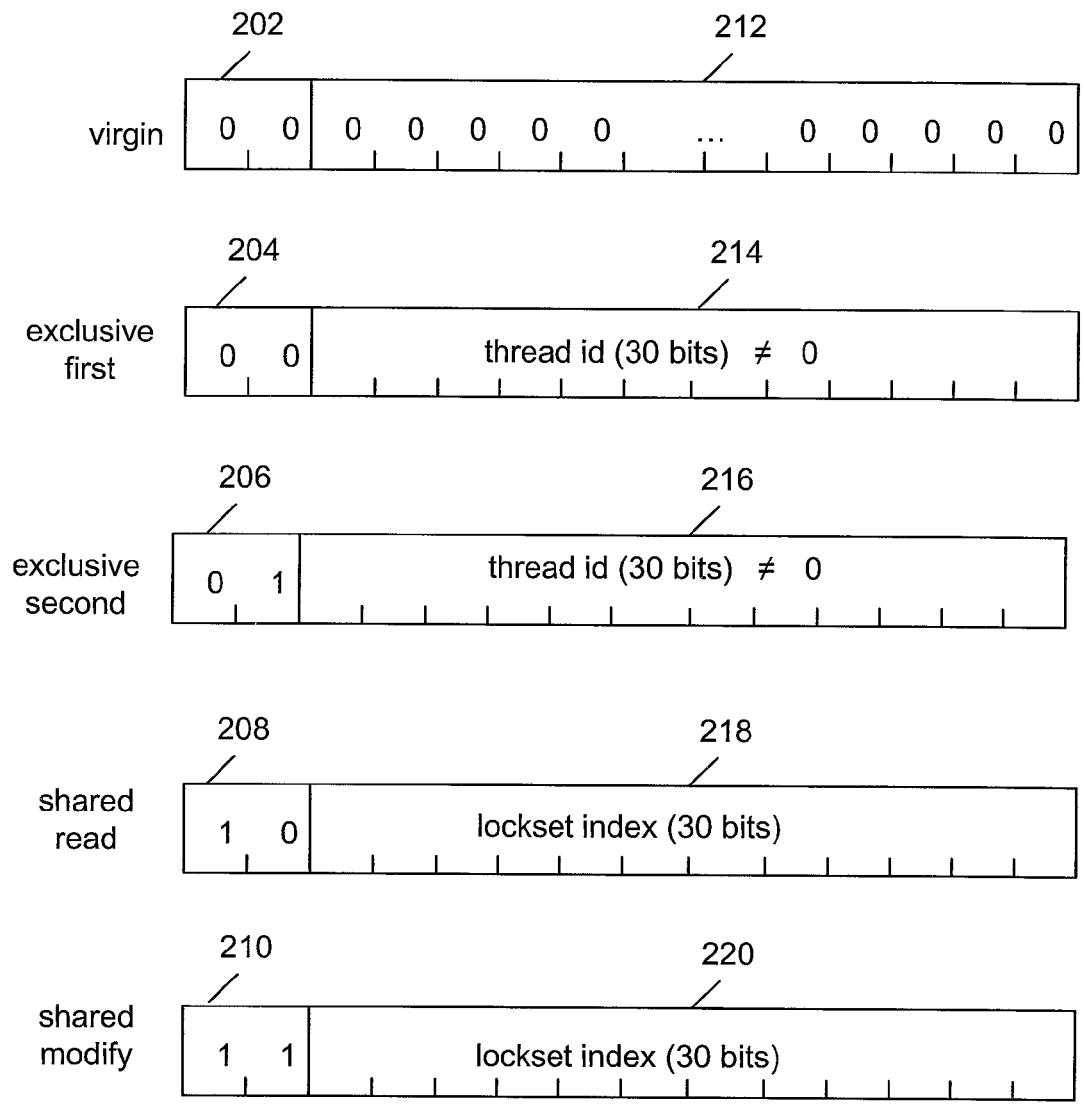
FIG. 2 illustrates conventional encoding of access patterns.
Figure 3:
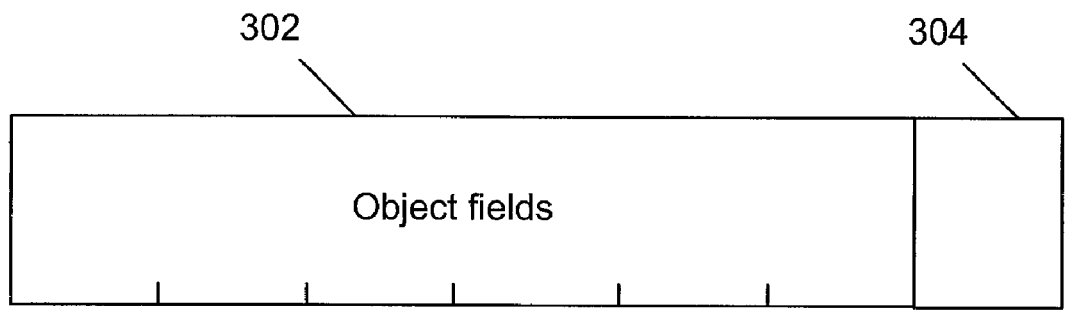
FIG. 3 illustrates an exemplary object layout in accordance with the present invention.

FIG. 3 illustrates an exemplary object storage layout. Access patterns are initially computed at an object level of granularity. As an example, the object layout may include object fields storage 302 and access pattern storage 304. Access pattern storage 304 has been added to the end of the object fields storage 302 to store the whole-object access pattern associated with the particular object. In some embodiments, the access pattern storage 304 may also be added to the beginning of object fields storage 302.

Figure 4:
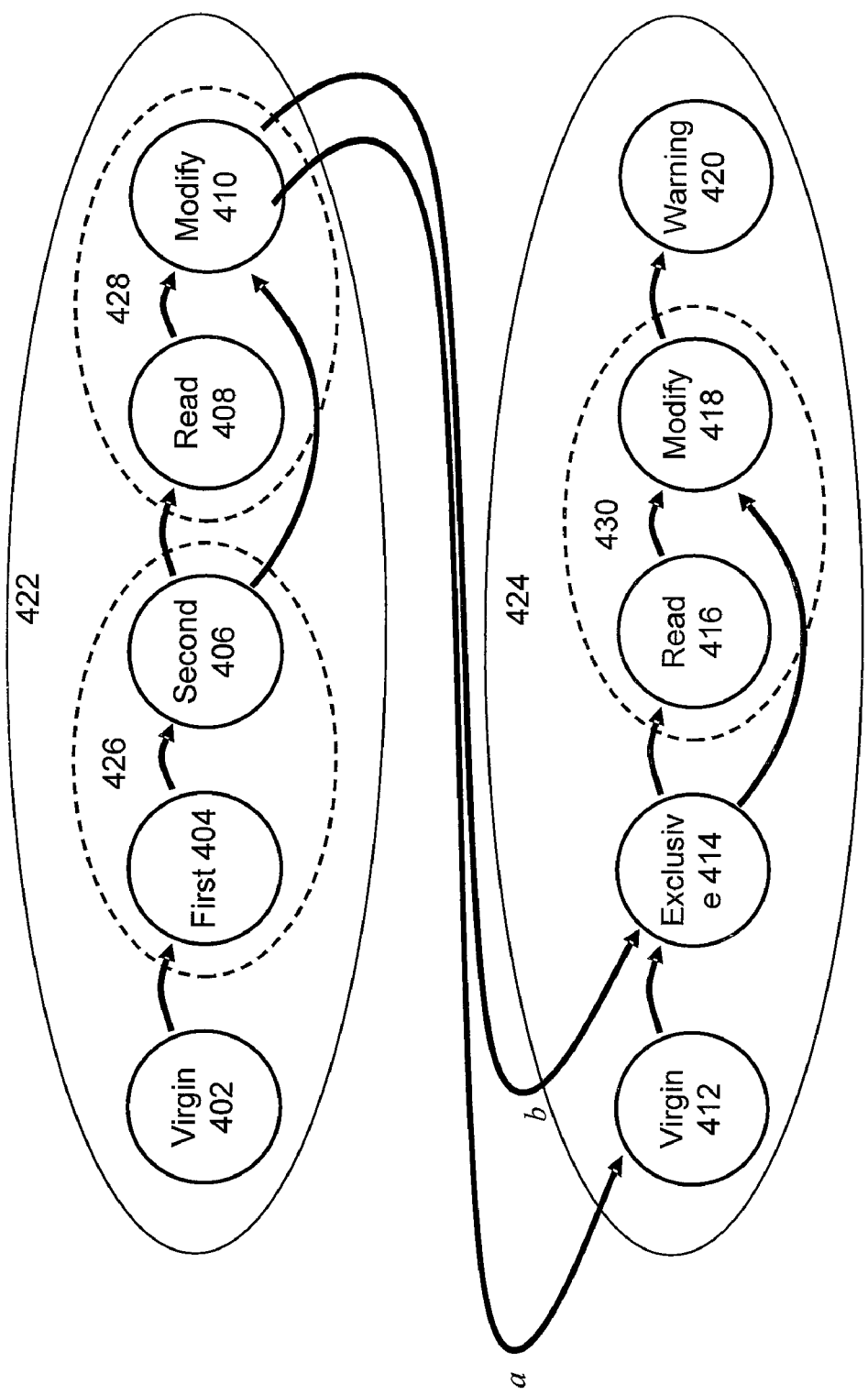
FIG. 4 illustrates an exemplary access pattern state diagram for adaptive granularity refinement in detecting potential data races in accordance with the present invention.

FIG. 4 illustrates an exemplary access pattern state diagram for adaptive granularity refinement in detecting potential data races. As an example, each object starts in an "object granularity virgin" state 402 and moves through various object granularity states 402-410. "Object granularity" refers to the object level for access patterns, as opposed to "memory location granularity" that describes a level of detail associated with individual memory locations within an object. After progressing through object granularity states 402-410, pattern detection granularity is refined to a memory location. At a memory location level of granularity, an item transitions through memory location granularity states 412-420. Object granularity superstate 422 and memory location granularity superstate 424 represent a collection of states at the object and memory locations, respectively. Object granularity superstate 422 includes exclusive object granularity superstate 426 and shared object granularity superstate 428. Memory location granularity superstate 424 includes shared memory location granularity superstate ("shared") 430.

Starting from an "object granularity virgin" state 402, an object progresses to exclusive first state 404 when accessed by a first thread. When another thread (apart from the first thread) accesses the object, the object state transitions to exclusive second state 406. When another thread (apart from the second threads) accesses the object, the state of the object is shifted into shared states 408 or 410, depending upon whether the accessing thread is attempting to perform a read or write operation. However, when an access occurs that results in the detection of a whole-object granularity "shared modify" state 410 with an empty lockset, pattern detection granularity is refined instead of generating a warning based on encountering a suspicious pattern as would occur in the prior art.

Here, a block of storage is allocated to hold an array of access patterns, one access pattern for each memory location in an object. As an example, each of these access patterns is initialized to a memory location granularity virgin state 412 (represented by arc a) except for the access pattern corresponding to the memory location of a current access (i.e., an access in progress). A current access pattern, in turn, is initialized to a memory location granularity exclusive state 414 (represented by arc b). Then the address of this block of storage is recorded in the object access pattern with an indication that the object has been refined to memory location granularity. As an example, an indication may be implemented using additional bits for encoding within a state word. In some examples, words may include identifiers, addresses or other descriptive information.

Figure 5:
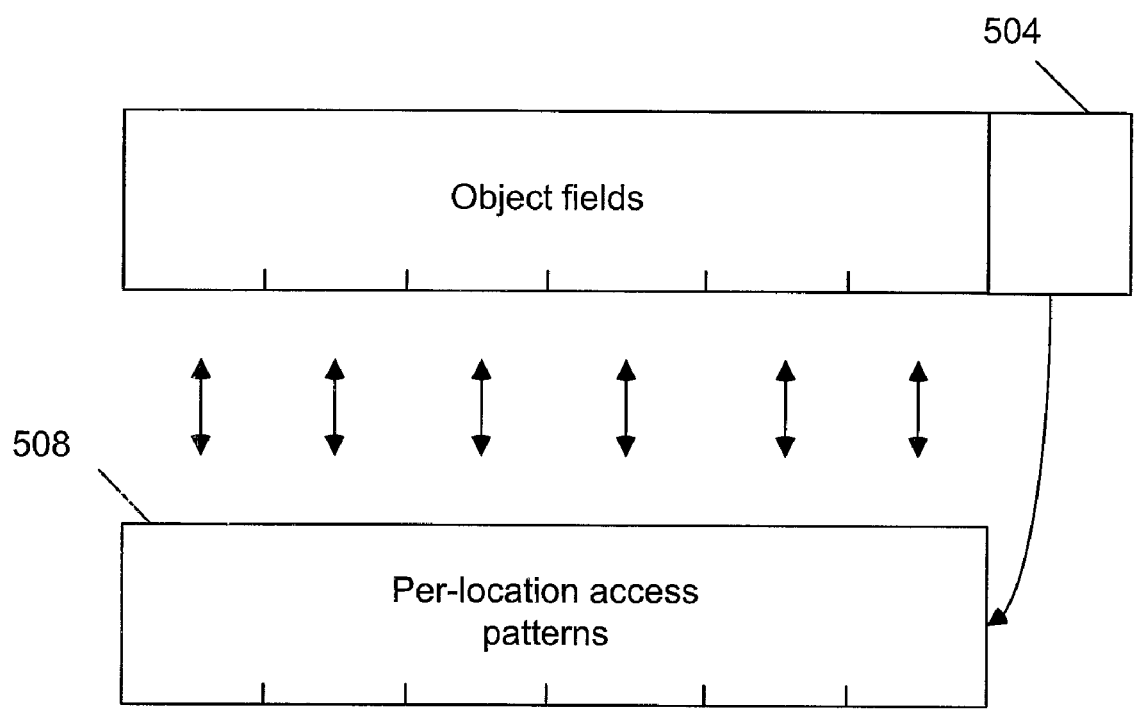
FIG. 5 illustrates an exemplary storage layout for an object after refining access pattern detection granularity to per-location access pattern words in accordance with the present invention.
Figure 6:
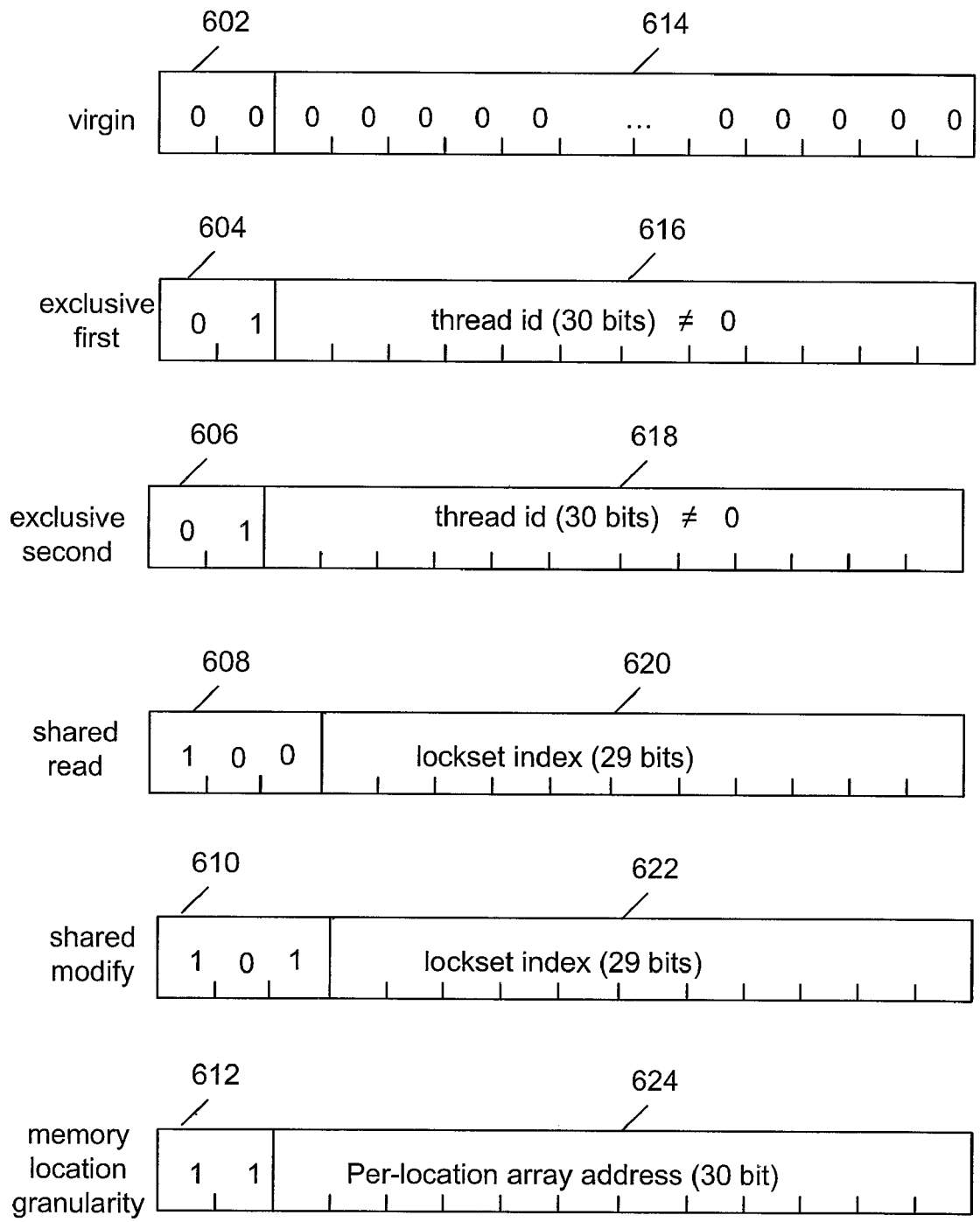
FIG. 6 illustrates exemplary state word encoding for whole-object access patterns in accordance with the present invention.

FIG. 5 illustrates an exemplary storage layout for an object after refining access pattern detection granularity to per-location access pattern words. Here, once the object access pattern detection has been refined to memory location granularity, per-location access patterns 508 are generated and access pattern storage 504 is updated to point to 508. Accesses to each location in an object are used to update the individual access patterns for a memory location according to the memory location granularity section (e.g., states 412-420) of the state diagram illustrated in FIG. 4. Further, since the object itself is already known to be shared, one can assume that initialization is finished. This enables state transitions different than conventional solutions by eliminating the need to divide the exclusive state into "first" and "second" states. FIG. 6 illustrates an example of encoding "memory location granularity" states (e.g., states 412-420) into the per-location access pattern words illustrated in FIG. 5.

FIG. 6 illustrates exemplary state word encoding for object access patterns. Here, encoding for the object access pattern word is illustrated by using encoded headers 602-612 to encode state words (e.g., fields, indices in locksets, thread identifiers, and the like) 614-624. Initially, virgin state word header 602 and virgin state word field 614 are set to "0" in all fields. When a first access occurs, an encoded state word is created using exclusive first header 604 to encode a thread identifier for the accessing thread in exclusive first field 616 (a thread identifier is assumed to have a value other than "0"). After another access occurs, a state transition occurs from the exclusive first state to the exclusive second state. Here, an encoded state word is created using exclusive second header 606 to encode a thread identifier for exclusive second field 618. If another thread attempts to a read access in the second state, then a state transition occurs into a shared read state. In this example, an encoded state word is generated using shared read header 608 (which includes an extra bit for encoding purposes) to encode a lockset index 620 for the shared read. However, if the access is a write operation, then a state transition occurs from an exclusive second state to a shared modify state. In this situation, an encoded state word is created using shared modify header 610 to encode lockset index 622. By adapting the granularity of pattern detection to a memory location, an encoded state word may be created on a per-location basis. Using memory location granularity header 612 (i.e., encoding bits), a per-location array address 624 is encoded. However, if lockset index 622 is empty at the shared modify state, then a warning is generated as a suspicious pattern has been detected, indicating a potential data race. As an example, by refining pattern detection granularity from an object to a memory location, an object access pattern word stores an address for the per-location access pattern array, as shown in FIG. 6. In some embodiments, storage allocation may be aligned on four-byte boundaries and thus thirty bits may be used to store an address. In other examples, different implementations and variations of the state diagrams, encodings, and byte boundaries described above may be performed.

Figure 7:
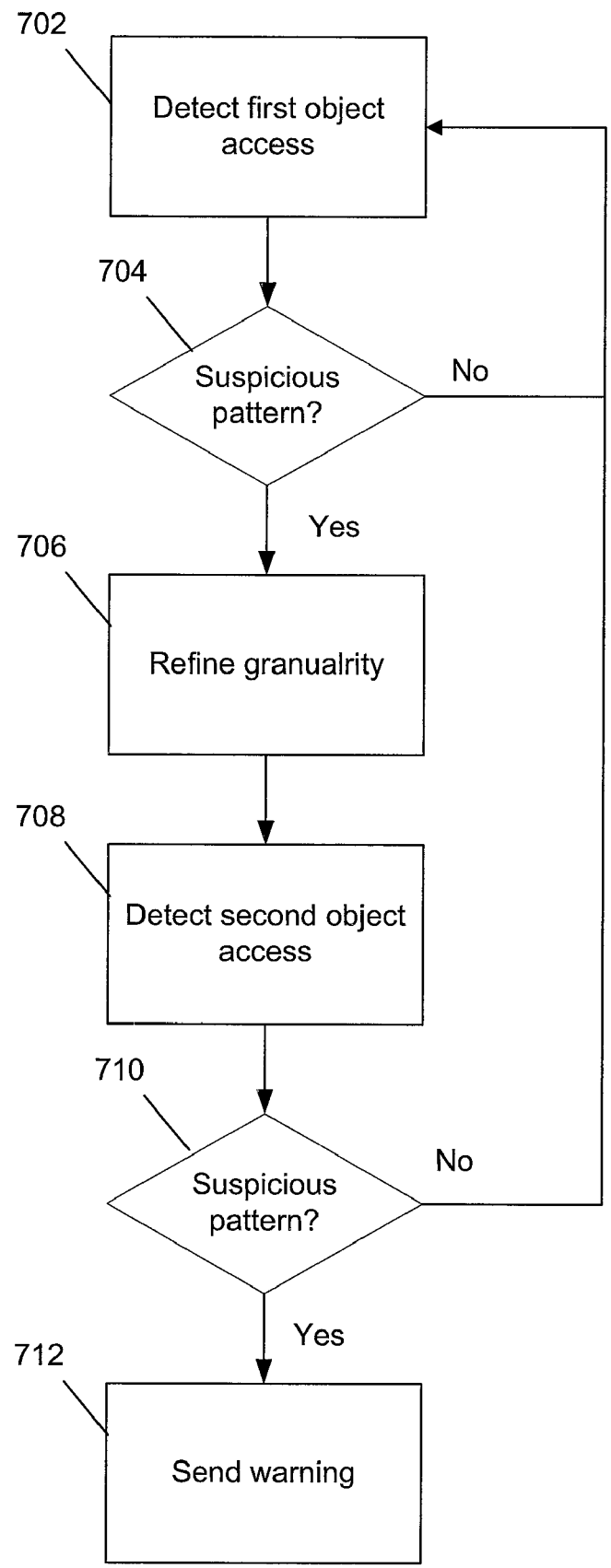
FIG. 7 is a flow chart illustrating an exemplary process for adaptive granularity refinement in detecting potential data races in accordance with the present invention.

FIG. 7 is a flow chart illustrating an exemplary process for adaptive granularity refinement in detecting potential data races. In some embodiments, a first access is detected on an object (i.e., object level of granularity) (702). Once detected, a determination is made as to whether a suspicious pattern exists (704). If no suspicious pattern is detected, the process restarts and continues to detect object accesses (702). However, if a suspicious pattern is detected, then pattern detection granularity is automatically refined from the object to an individual memory location within the object (706). Once the pattern detection granularity is refined, further accesses are evaluated to detect the occurrence of a second access at the memory location (708). Once detected, it is determined whether the second access also has a suspicious pattern (710). Determination of suspicious patterns is described in greater detail below in connection with FIG. 8.

Here, if a suspicious pattern is not detected, the process restarts and continues to detect further object accesses (702). However, if a suspicious pattern is detected, then a warning state is entered, as described in connection with the state diagram in FIG. 4, and a warning is sent (712). In some examples, the warning indicates that a shared modify access with an empty lockset has occurred at the memory location, indicating that a potential data race may exist. Subsequently, a warning may be generated and the process restarts and continues to detect further object accesses (702). As an example, this process enables the creation of an extra storage space when a suspicious pattern is first detected at a object, before refining pattern detection granularity to an individual memory location within the object.

Figure 8:
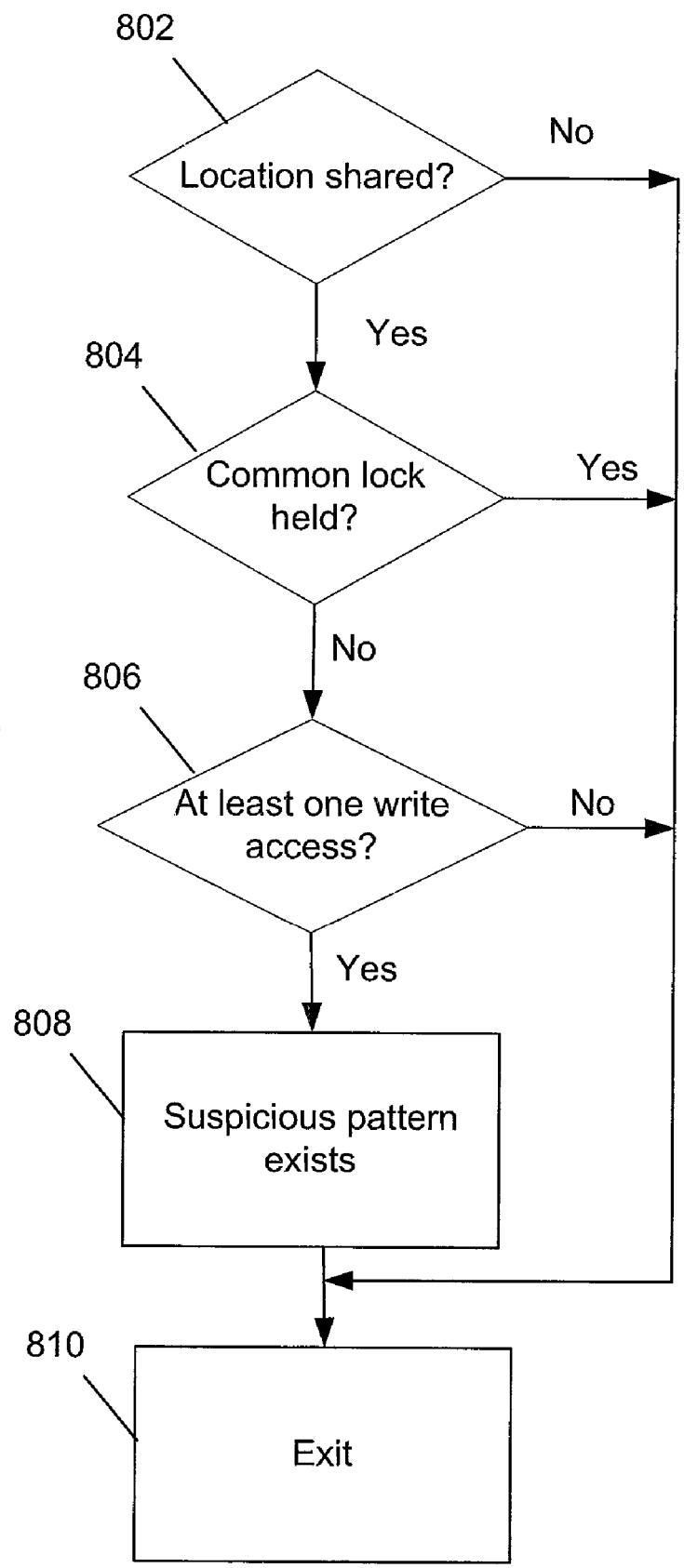
FIG. 8 is a flow chart illustrating an exemplary process for determining whether a suspicious access pattern exists in accordance with the present invention.

FIG. 8 is a flow chart illustrating an exemplary process for determining whether a suspicious access pattern exists. As an example, this process may be used in place of steps 704 and 710 in the process flow chart of FIG. 7. Here, a series of determinations is made as to whether an access meets the criteria for a suspicious access pattern, as described above.

In some embodiments, it is determined whether a location is shared among multiple threads (802). As mentioned above, accesses may be performed by various threads of a multi-threaded program or multiple programs. If a location is not shared among multiple threads, then a suspicious pattern will not occur and the process may exit (810). However, if a location is shared among multiple threads, then a second determination is made as to whether a common lock is held by the programs accessing the location (804). As an example, a lack of common lock indicates that a potential data race may exist where multiple accesses are occurring by either a multi-threaded program or multiple programs causing anomalous and unpredictable results to occur. If a common lock is indicated, then a suspicious pattern does not occur and the process may exit (810). However, if no common lock is indicated among the accesses attempting to share a given variable, then a further determination is made as to whether at least one of the accesses is a write (806). If one of the accesses is a write, then a determination is made that a suspicious pattern exists (808). However, if the accesses are all read operations, then a suspicious pattern does not occur, as all of the accesses are reading the same value and thus different or anomalous results may not be generated. In other examples, these determinations and the factors used to determine whether a suspicious pattern exists may be varied.

Exemplary Computing Environment

FIG. 9 illustrates an example of a suitable computing system environment 900 in which the invention may be implemented. The computing system environment 900 is only one example of a suitable computing environment and is not intended to suggest any limitation as to the scope of use or functionality of the invention. Neither should the computing environment 900 be interpreted as having any dependency or requirement relating to any one or combination of components illustrated in the exemplary operating environment 900.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 9, an exemplary system for implementing the invention includes a general purpose computing device in the form of a computer 910. Components of computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 910 typically includes a variety of computer readable media. Computer readable media can be any available media that can be accessed by computer 910 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 910. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 930 includes computer storage media in the form of volatile and/or non-volatile memory such as ROM 931 and RAM 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 9 illustrates operating system 934, application programs 935, other program modules 936, and program data 937.

The computer 910 may also include other removable/non-removable, volatile/non-volatile computer storage media. By way of example only, FIG. 9 illustrates a hard disk drive 941 that reads from or writes to non-removable, non-volatile magnetic media, a magnetic disk drive 951 that reads from or writes to a removable, non-volatile magnetic disk 952, and an optical disk drive 953 that reads from or writes to a removable, non-volatile optical disk 956, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and magnetic disk drive 951 and optical disk drive 953 are typically connected to the system bus 921 by a removable memory interface, such as interface 950.

The drives and their associated computer storage media provide storage of computer readable instructions, data structures, program modules and other data for the computer 910.

In FIG. 9, for example, hard disk drive 941 is illustrated as storing operating system 944, application programs 943, other program modules 946, and program data 947. Note that these components can either be the same as or different from operating system 934, application programs 935, other program modules 936, and program data 937. Operating system 944, application programs 943, other program modules 946, and program data 947 are given different numbers here to illustrate that, at a minimum, they are different copies. A user may enter commands and information into the computer 910 through input devices such as a keyboard 962 and pointing device 961, commonly referred to as a mouse, trackball or touch pad. Other input devices (not shown) may include a microphone, joystick, game pad, satellite dish, scanner, or the like. These and other input devices are often connected to the processing unit 920 through a user input interface 960 that is coupled to the system bus, but may be connected by other interface and bus structures, such as a parallel port, game port or a universal serial bus (USB). A monitor 991 or other type of display device is also connected to the system bus 921 via an interface, such as a video interface 990. In addition to the monitor, computers may also include other peripheral output devices such as speakers 997 and printer 996, which may be connected through an output peripheral interface 993.

The computer 910 may operate in a networked environment using logical connections to one or more remote computers, such as a remote computer 980. The remote computer 980 may be a personal computer, a server, a router, a network PC, a peer device or other common network node, and typically includes many or all of the elements described above relative to the computer 910, although only a memory storage device 981 has been illustrated in FIG. 9. The logical connections depicted include a LAN 971 and a WAN 973, but may also include other networks. Such networking environments are commonplace in offices, enterprise-wide computer networks, intranets and the internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the internet. The modem 972, which may be internal or external, may be connected to the system bus 921 via the user input interface 960, or other appropriate mechanism. In a networked environment, program modules depicted relative to the computer 910, or portions thereof, may be stored in the remote memory storage device. By way of example, and not limitation, FIG. 9 illustrates remote application programs 983 as residing on memory device 981. It will be appreciated that the network connections shown are exemplary and other means of establishing a communications link between the computers may be used.

As mentioned above, while exemplary embodiments of the present invention have been described in connection with various computing devices, the underlying concepts may be applied to any computing device or system.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language may be a compiled or interpreted language, and combined with hardware implementations.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed:

1. A system for detecting a data race, comprising:
    a memory having stored therein computer-executable instructions for storing an object and a memory location within the object;
    a computer processor that executes the computer-executable instructions; and
    logic configured to detect a first access to the object, determine whether the first access is associated with a suspicious pattern, and refine a pattern detection granularity from the object to the memory location within the object if a determination is made that the first access is associated with the suspicious pattern.

2. The system of claim 1, wherein the logic is further configured to report the data race if a second access associated with the suspicious pattern occurs at the memory location after the pattern detection granularity is refined.

3. A computer-readable storage medium with computer-executable instructions stored thereon for:
    detecting a first access to an object;
    determining whether the first access is associated with a suspicious pattern; and
    refining a pattern detection granularity from the object to a memory location within the object if a determination is made that the first access is associated with the suspicious pattern.

4. The computer-readable storage medium of claim 3, further comprising computer-executable instructions for:
    reporting the data race if a second access associated with the suspicious pattern occurs at the memory location after the pattern detection granularity is refined.

* * * * *